(12) United States Patent
Jacques et al.

(10) Patent No.: US 7,830,130 B2
(45) Date of Patent: *Nov. 9, 2010

(54) FORWARD POWER CONVERTER CONTROLLERS

(75) Inventors: Russell Jacques, Withersfield (GB); Paul Ryan, Cambridgeshire (GB); Catriona McKay, Hertfordshire (GB); Devarahandi Indika Mahesh de Silva, Cambridgeshire (GB); David M. Garner, London (GB); Vinod A. Lalithambika, Cambridge (GB)

(73) Assignee: Cambridge Semiconductor Limited (GB)

( * ) Notice: Subject to any disclaimer, the term of this patent is extended or adjusted under 35 U.S.C. 154(b) by 457 days.

This patent is subject to a terminal disclaimer.

(21) Appl. No.: 11/732,108

(22) Filed: Apr. 2, 2007

(65) Prior Publication Data

US 2008/0239764 A1    Oct. 2, 2008

(30) Foreign Application Priority Data

Mar. 30, 2007 (GB) .................................. 0706246.6

(51) Int. Cl.
*G05F 1/40* (2006.01)
(52) U.S. Cl. ..................................... 323/282; 363/21.04
(58) Field of Classification Search ......... 323/282–286, 323/351; 363/16–20, 21.11, 21.12; 361/93–94, 361/115, 159, 169.01
See application file for complete search history.

(56) References Cited

U.S. PATENT DOCUMENTS 4,392,474 A    7/1983    Minner

| 4,415,959 A | 11/1983 | Vinciarelli |
| 4,564,800 A | 1/1986 | Jurjans |
| 4,688,160 A | 8/1987 | Fraidlin |
| 4,783,727 A | 11/1988 | Neumann |
| 4,788,634 A | 11/1988 | Schlecht et al. |
| 4,888,821 A | 12/1989 | Hamp, III et al. |
| 5,278,748 A | 1/1994 | Kitajima |
| 5,291,385 A | 3/1994 | Vinciarelli |

(Continued)

FOREIGN PATENT DOCUMENTS

EP    0055064 A2    6/1982

(Continued)

OTHER PUBLICATIONS

"United Kingdom Search Report for Application No. GB0706246.6, Dated Jun. 14, 2007", 1 Page.

(Continued)

*Primary Examiner*—Rajnikant B Patel
(74) *Attorney, Agent, or Firm*—Schwegman, Lundberg & Woessner, P.A.

(57) ABSTRACT

This invention relates to control techniques and controllers for resonant discontinuous forward power converters (RD-FCs).

A method of controlling a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, said method comprising: sensing a primary winding signal during an on period of said switch, said primary winding signal representing a current in said primary winding; comparing said sensed primary winding signal with a threshold value; and controlling one or both of an on and off duration of said switch in response to said comparison.

6 Claims, 8 Drawing Sheets

U.S. PATENT DOCUMENTS

| | | | |
|---|---|---|---|
| 5,315,533 A * | 5/1994 | Stich et al. ............... 700/298 |
| 5,424,933 A | 6/1995 | Illingworth |
| 5,986,901 A | 11/1999 | Weng et al. |
| 5,991,172 A * | 11/1999 | Jovanovic et al. ........ 363/21.14 |
| 6,205,037 B1 | 3/2001 | Fitzgerald, Jr. |
| 6,249,444 B1 | 6/2001 | Cross |
| 6,252,781 B1 | 6/2001 | Rinne et al. |
| 6,295,214 B1 | 9/2001 | Matsumoto et al. |
| 6,304,463 B1 | 10/2001 | Krugly |
| 6,314,010 B1 | 11/2001 | Markow et al. |
| 6,396,718 B1 | 5/2002 | Ng et al. |
| 6,760,236 B2 | 7/2004 | Hsieh |
| 7,436,153 B2 | 10/2008 | Logsdon |
| 7,714,554 B2 | 5/2010 | Jacques et al. |
| 2005/0152160 A1 | 7/2005 | Fung et al. |
| 2005/0270809 A1 | 12/2005 | Koch |
| 2007/0274108 A1 | 11/2007 | Jacques |
| 2008/0037293 A1 | 2/2008 | Jacques et al. |
| 2008/0239761 A1 | 10/2008 | Jacques et al. |
| 2008/0239762 A1 | 10/2008 | Jacques et al. |
| 2008/0239764 A1 | 10/2008 | Jacques et al. |

FOREIGN PATENT DOCUMENTS

| | | |
|---|---|---|
| EP | 0074399 | 3/1983 |
| GB | 2402005 | 11/2004 |
| JP | 09-182429 | 7/1997 |
| WO | WO-9919976 A1 | 4/1999 |

OTHER PUBLICATIONS

International Application No. PCT/GB2008/050220, Partial International Search Report, 2 pgs.

"UCC38C42 25-Watt Self-Resonant Reset Forward Converter", *Reference Design*, © 2002 Texas Instruments Incorporated,(2002),10 pgs.

United Kingdom Search Report for Application No. GB0706249.0, dated Oct. 18, 2007, 1 pg.

United Kingdom Search Report for Application No. GB0706256.5, dated Jun. 14, 2007, 1 pg.

United Kingdom Search Report for Application No. GB0706249.0, dated Jun. 7, 2007, 1 pg.

Higashi, T., et al., "Voltage-Mode Resonant Forward Converter With Capacitor-Input Filter", *IEICE Transactions on Communications*, vol. E79-B, No. 1, (1996), 37-44.

Jacques, R., et al., "Forward Power Converter Controllers", U.S. Appl. No. 11/732,107, filed Apr. 2, 2007, 32 pgs.

Jacques, R., et al., "Forward Power Converter Controllers", U.S. Appl. No. 11/732,140, filed Apr. 2, 2007, 64 pgs.

"International Application Serial No. PCT/GB2008/050221, International Search Report mailed Aug. 22, 2008", 3 pgs.

Spiazzi, G., "A New Soft-Switching Forward DC-DC Converter Operating in Discontinuous Conduction Mode", *Conference Proceedings, 33rd Annual IEEE Power Electronics Specialists Conference (PESC 2002)*, (Cairns, Queensland, Australia, Jun. 23-27, 2002), (2002), 1343-1348.

"U.S. Appl. No. 11/732,107 Received May 14, 2010", 15 pgs.

"U.S. Appl. No. 11/732,140, Notice of Allowance mailed Feb. 24, 2010", 10.

"International Application Serial No. PCT/GB2008/050222, Invitation to Pay Additional Fees and Partial Search Repor mailed Sep. 9, 2008", 6 pgs.

"United Kingdom Application Serial No. GB0905764.7, Examination Report mailed Apr. 27, 2009", 6 pgs.

"United Kingdom Application Serial No. GB0905764.7, Search Report dated Apr. 24, 2009", 1 pg.

"United Kingdom Appllication Serial No. GB0905764.7, Response filed Aug. 27, 2009 to Official Communication dated Apr. 27, 2009", 49 pgs.

"U.S. Appl. No. 11/732,107, Non-Final Office Action mailed Feb. 18, 2009", 13 pgs.

"U.S. Appl. No. 11/732,107, Non-Final Office Action mailed Jun. 9, 2009", 7 pgs.

"U.S. Appl. No. 11/732,107, Notice of Allowance mailed Dec. 15, 2009", 4 Pgs.

"U.S. Appl. No. 11/732,107, Preliminary Amendment filed Apr. 2, 2007", 3 pgs.

"U.S. Appl. No. 11/732,107, Response filed Nov. 9, 2009 to Non Final Office Action mailed Jun. 9, 2009", 12 pgs.

"U.S. Appl. No. 11/732,107, Response filed May 18, 2009 to Non Final Office Action mailed Feb. 18, 2009" , 14 pgs.

"U.S. Appl. No. 11/732,140, Non Final Office Action mailed Aug. 3, 2009", 26 pgs.

"U.S. Appl. No. 11/732,140, Preliminary Amendment filed Apr. 2, 2007", 3 pgs.

"U.S. Appl. No. 11/732,140, Response filed Dec. 3, 2009 to Non Final Office Action mailed Aug. 3, 2009", 22 pgs.

"International Application No. PCT/GB2008/050220, International Search Report mailed Oct. 15, 2008", 5 pgs.

"International Application No. PCT/GB2008/050220, Written Opinion mailed Oct. 15, 2008", 8 pgs.

"International Application Serial No. PCT/GB2008/050221, Written Opinion mailed Aug. 22, 2008", 6 pgs.

"International Application Serial No. PCT/GB2008/050222, International Search Report mailed Mar. 25, 2009", 3 pgs.

"Nternational Application Serial No. PCT/GB2008/050222, Written Opinion mailed Mar. 25, 2009", 10 pgs.

\* cited by examiner

FORWARD POWER CONVERTER CONTROLLERS

RELATED APPLICATION

This application claims priority under 35 U.S.C. 119 to United Kingdom Application No. 0706246.6, filed Mar. 30, 2007, which application is incorporated herein by reference and made a part hereof.

FIELD OF THE INVENTION

This invention relates to control techniques and controllers for resonant discontinuous forward power converters (RDFCs).

BACKGROUND TO THE INVENTION

FIG. 1 (which is taken from U.S. Pat. No. 4,688,160) shows an example of a forward power converter comprising a dc input 101, 102 coupled to the primary winding 109 of a transformer 110. The primary winding 109 is connected in series with a switching device 105, here a bipolar transistor, which switches on and off, during an on period building up magnetising flux in the primary winding 109, which drives a current in a secondary winding 111 of the transformer. Unlike a so-called flyback converter, in a forward converter the primary and secondary windings have matched polarities, as indicated by the dots on the windings in FIG. 1. The output from the transformer 110 is rectified by a rectifier 114 and smoothed by a smoothing capacitor 119 to provide a dc output 121, 122. When switch 105 is off the core of the transformer is "reset" allowing the magnetising flux to return to its initial state. In the example of FIG. 1 (U.S. Pat. No. 4,688,160) this is performed by resonant action between the magnetising inductance of transformer 110 and a capacitor 113 shunting diode 114, returning energy to the input voltage source.

The circuit of FIG. 1 includes a large output choke 117 between rectifier 114 and smoothing capacitor 119, and a freewheeling or "flyback" diode 115 across the series combination of choke 117 and smoothing capacitor 119. This is because when the switch 105 is turned off, because the primary and secondary windings have the same sense, rectifier 114 immediately becomes non-conducting. The function of the freewheeling diode 115 is to allow the choke 117 to maintain a continuous output current into output node "X" when switch 105 is off by providing a path for this current.

FIG. 1 shows a conventional, continuous forward converter. There are many other prior art documents describing such converters, including, for example, U.S. Pat. No. 4,415,959; U.S. Pat. No. 6,760,236; U.S. Pat. No. 6,304,463; U.S. Pat. No. 6,252,781; EP0 074 399; and the reference design SLUA276 for the Texas Instruments UCC38C42. In some of these later circuits the secondary side diodes are replaced by synchronous rectifiers embodied in MOS transistors. Other background prior art can be found in U.S. Pat. No. 4,788,634 which describes a resonant forward converter in which natural self-inductance of the transformer in parallel with the transformer provides a resonant "ring" so that the switching circuit can be self-resonant; and US 2005/0270809 (WO 2004/057745) which describes use of an auxiliary transformer in a current limiting circuit.

We have previously described, in our earlier patent applications GB0610422.8 filed 26 May 2006 and U.S. Ser. No. 11/449,486 filed 8 Jun. 2006, how improved operation such as improved regulation and start-up may be achieved by use of switch control in a discontinuous current flow mode.

We now describe further control techniques for RDFCs.

SUMMARY OF THE INVENTION

The present invention provides a method of controlling a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, said method comprising: sensing a primary winding signal during an on period of said switch, said primary winding signal representing a current in said primary winding; comparing said sensed primary winding signal with a threshold value; and controlling one or both of an on and off duration of said switch in response to said comparison.

The above method advantageously enables an RDFC to be controlled using signals sensed on the primary side of the transformer, which obviates the need for the use of isolated components to convey feedback signals from the secondary side of the transformer to a controller. This may reduce the cost of such a device.

Preferably, said threshold value is an overload threshold value; and said method further comprises: generating an overload signal for triggering an overload condition in said RDFC, said overload signal representing a period during which said sensed primary winding signal is greater than said overload threshold value. Generating an overload signal may prevent damage occurring to the transformer.

Preferably, the method further comprises: sensing a first event associated with switch on of said switch; sensing a second event associated with said overload signal; determining a duration between said first and second events; comparing said duration with an overload period threshold value; and generating an early overload detection signal for detecting an early overload condition of said RDFC, said early overload detection signal being generated in response to said sensed duration being below said overload period threshold value.

Preferably, said duration is sampled over two or more on and off cycles of said switch and wherein said duration is compared with said overload period threshold value. Preferably, said on duration of said switch is reduced in response to said overload condition. Preferably, one or both of said on and off durations are controlled in response to said early overload detection signal. Preferably, said switch is switched off in response to said overload condition, or said overload detection signal.

Preferably, the method comprises entering a latched mode following detection of said overload or early overload condition, said latched mode defining a period during which durations of one or both of said on and off durations of said switch are varied in response to said overload or early overload conditions or conduction of the switch is disabled.

Preferably, the method comprises a starting method, said starting method comprising: increasing said on duration or reducing said off duration of said switch for a burst period.

Preferably, said burst period is increased if said sensed primary signal falls below said overload threshold value during said burst period. Alternatively, said burst period is increased if said duration is above said overload period threshold value during said burst period. Preferably, said RDFC is prevented from entering a latched mode during said starting method, said latched mode defining a period during which durations of one or both of said on and off durations of said switch are varied in response to said overload or early overload conditions or conduction of the switch is disabled.

In an alternative embodiment of the present invention, said threshold is a regulation threshold value; and wherein said on duration of said switch is reduced or said off duration of said switch is increased in response to said comparison.

Preferably, said sensing of said primary signal comprises: detecting turn on of said switch; waiting for a delay period; sampling said primary winding signal at an end of said delay period.

Preferably, said detecting turn on of said switch comprises: detecting an increase in said primary winding signal following turn on of said switch that is greater than a first threshold value. Alternatively, said detecting turn on of said switch comprises detecting a drive signal of said switch. Alternatively, said detecting turn on of said switch comprises: detecting a voltage across said switch.

Preferably, an output voltage of said RDFC is regulated.

The present invention also provides a controller for controlling a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, the controller comprising: an input to sense a primary winding signal during an on period of said switch, said primary winding signal representing an operational current in said primary winding; a comparison means to compare said sensed primary winding signal with a threshold value; and an output to control one or both of an on and off duration of said switch in response to said comparison.

The present invention also provides a method of detecting an overload condition of a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, said method comprising: sensing a primary winding signal during an on period of said switch, said primary winding signal representing an operational current in said primary winding; comparing said sensed primary winding signal with an overload threshold; and generating an overload signal for triggering an overload condition in said RDFC, said overload signal representing a period during which said sensed primary winding signal is greater than said overload threshold.

Preferably, the above method comprises: sensing a first event associated with switch on of said switch; sensing a second event associated with said overload signal; determining a duration between said first and second events; comparing said duration with an overload period threshold value; generating an early overload detection signal for detecting an early overload condition of said RDFC, said early overload detection signal being generated in response to said sensed duration being below said overload period threshold value.

Preferably, said duration is sampled over two or more on and off cycles of said switch and wherein said duration is compared with said overload period threshold value.

The present invention further provides a controller configured to detect an overload condition of a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, the controller comprising: an input to sense a primary winding signal during an on period of said switch, said primary winding signal representing an operational current in said primary winding; comparison means to compare said sensed primary winding signal with an overload threshold value; and a system to generate an overload signal for triggering an overload condition in said RDFC, said overload signal representing a period during which said sensed primary winding signal is greater than said overload threshold value.

The present invention also provides a method for regulating an output voltage of a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, said method comprising: sensing a primary winding signal during an on period of said switch, said primary winding signal representing an operational current in said primary winding; comparing said sensed primary winding signal with a regulation threshold value; and controlling one or both of an on and off duration of said switch in response to said comparison.

Preferably, said sensing of said primary winding signal comprises: detecting turn on of said switch; waiting for a delay period; sampling said primary signal at an end of said delay period.

Preferably, said detecting turn on of said switch comprises: detecting an increase in said primary winding signal following turn on of said switch that is greater than a first threshold. Alternatively, said detecting turn on of said switch comprises detecting a drive signal of said switch. Alternatively, said detecting turn on of said switch comprises: detecting a voltage across said switch.

The present invention also provides a controller for regulating an output voltage of a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, the controller comprising: means for sensing a primary winding signal during an on period of said switch, said primary winding signal representing an operational current in said primary winding; means for comparing said sensed primary winding signal with a regulation threshold value; and means for controlling one or both of an on and off duration of said switch.

The present invention also provides a resonant discontinuous forward converter (RDFC) including a controller according to any one of above statements.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 1:
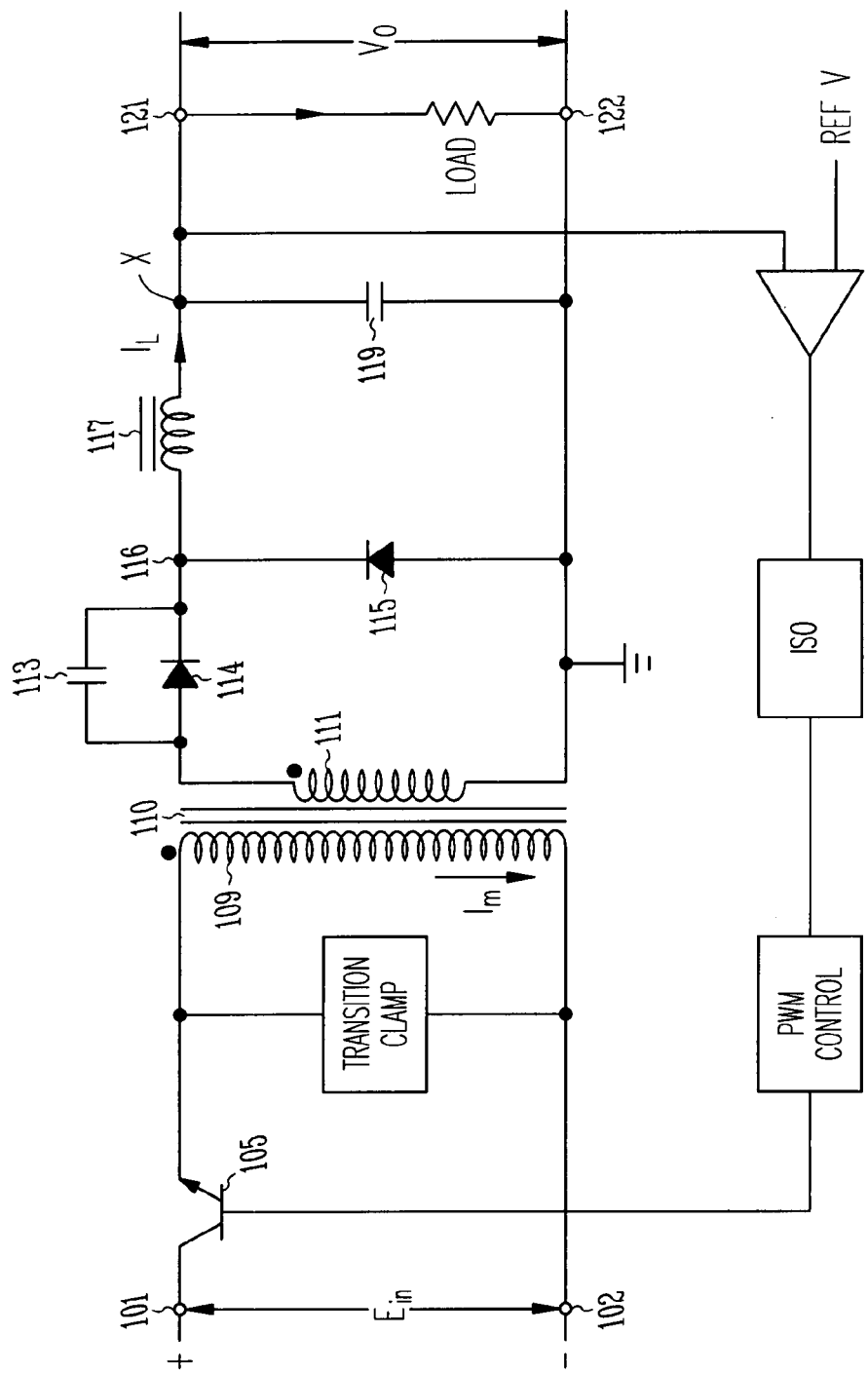
FIG. 1 shows an example of a forward converter according to the prior art.

In this specification we are concerned with controlling resonant discontinuous forward converters. In an exemplary RDFC power to a primary or input winding of a transformer is switched and a secondary or output winding of the transformer, with a polarity matched to that of the primary winding, is coupled to a rectifier which provides dc power to a smoothing capacitor, dc power being supplied by the RDFC to its output from this connection node X. A voltage waveform on the secondary winding of the transformer has a first portion during which the switch is on and current flows into the output connection node X, and second substantially resonant portion during which both the switch and the rectifier are off. Substantially no current flows into the connection node (other than from the smoothing capacitor) during the second portion of the voltage waveform.

In the designs we describe a connection between the rectifier and the connection node may include a small inductor (for example less than 5% of the primary side magnetising inductance) but substantially no current flows in this inductance during the second, resonant portion of the waveform and there is no need for a large choke of the type used in a continuous forward converter. There is no need connect a capacitor across the rectifier to achieve resonance; other connection positions are possible, for example, across a primary, secondary or auxiliary winding of the transformer. More particularly in embodiments we use the magnetising inductance of the transformer with an added capacitor on the primary side to achieve resonance in the off cycle.

In some preferred implementations the RDFC is configured for AC-DC power conversion and thus includes an AC-DC converter such as a bridge rectifier on the primary side. In some particularly preferred implementations the RDFC is mains-powered and the primary side is powered by a high dc voltage (for example greater than 70Vdc, 100Vdc, 150Vdc or 200Vdc) whilst the secondary side dc voltage is low (for example, less than 20Vdc or 10Vdc). In embodiments we employ minimum voltage switching on the primary side (i.e. a primary side switch is turned on at a time when a voltage across the switch is close to zero volts or at a minimum).

We have previously described techniques for implementing a resonant discontinuous forward converter (RDFC) which employ a control system to turn a power switch of the RDFC on and off in a controlled manner. As previously described, the control system may operate in an uncontrolled, fixed frequency mode or the control system may sense from one or more inputs and decide when to turn the power switch on and off responsive to this sensing, for example to implement pulse width and/or frequency modulation. This facilitates regulation of the RDFC which, in detail, may be performed using a range of algorithms. One technique uses the control system to operate the RDFC to compensate for circuit variables and to operate in a minimum voltage switching mode. The converter may also control the switching frequency during start-up and/or current limit in order to protect the power switch and increase the energy transferred to the load. The control system is preferably implemented using a control IC (integrated circuit).

As mentioned above, the RDFC operates without a freewheeling or flyback diode, and with or without an output inductor. However, if present the output inductor is sufficiently small to ensure that the forward converter operates in a discontinuous mode and substantially resonantly that is at or close to resonance.

Within an RDFC, the timing of the primary power switch has to be: in accordance with the resonance of the isolating transformer and other components forming part of the resonating circuit; managed to control the power transfer to the output; and appropriate to the other components (particularly the transformer) so they operate without excessive stress and within an efficient range. In preferred embodiments, timing is set by a controller, which determines the time to turn the primary switch on and how long to leave it on.

Figure 2:
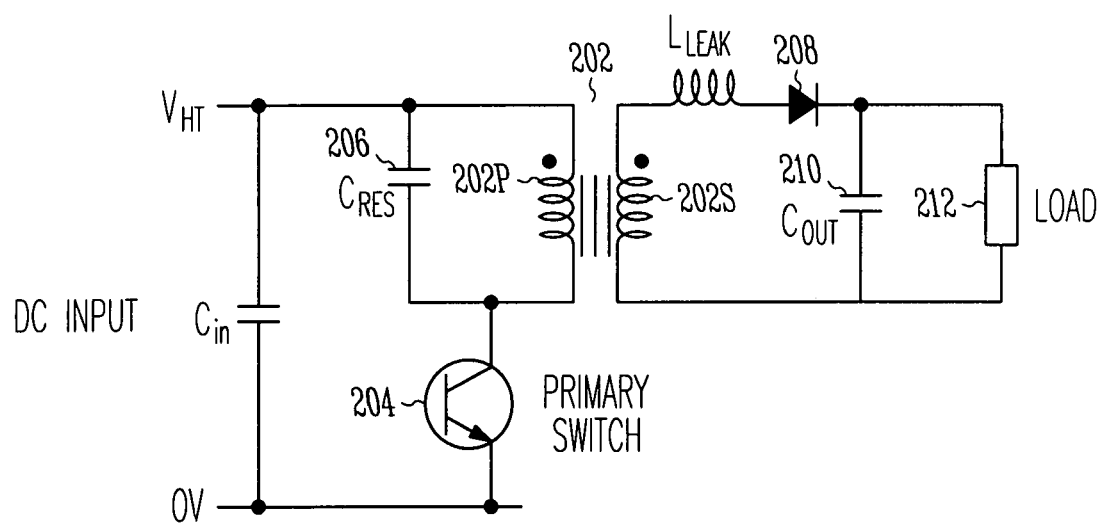
FIG. 2 shows a basic circuit diagram of an RDFC.

FIG. 2 shows a basic arrangement of an RDFC 200, comprising an isolating transformer 202 having primary $202_P$ and secondary $202_S$ windings. A switch 204, when closed, applies a DC voltage $V_{ht}$ across the primary winding of the transformer. Power is delivered to the load 212 via a rectifying diode 208 and smoothing capacitor 210. The polarity of the transformer is such that power is supplied to the output circuit when the primary switch is closed. Inductance $L_{leak}$ may be a discrete component or may be a characteristic of the transformer itself, in which case it can be modelled as an inductor in either the primary circuit or the secondary circuit, or both. The magnitude of $L_{leak}$ affects the behaviour and performance of the converter. For applications requiring more stable voltage regulation $L_{leak}$ is normally lower in value; for applications requiring a higher converter output impedance (such as battery chargers), its value is set higher.

Figure 3A:
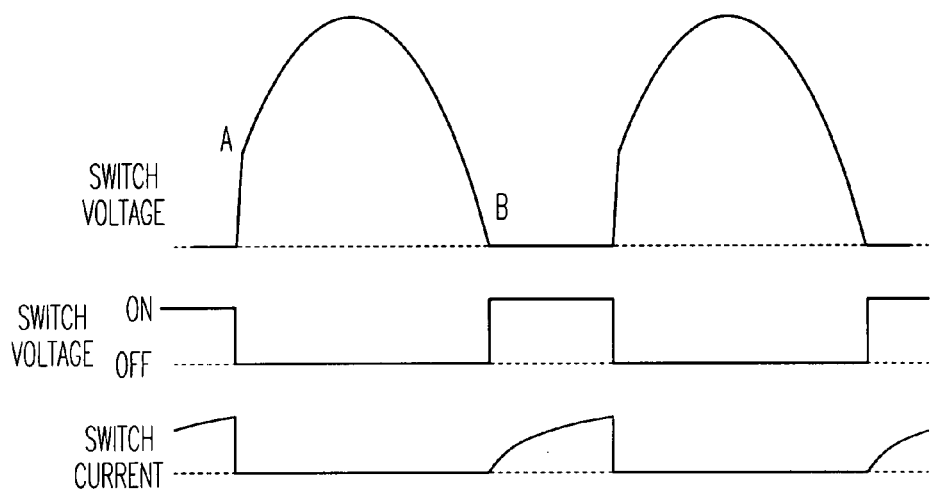
FIGS. 3a, 3b, 3c, 3d and 3e show example waveforms of converter operation.

Example waveforms of converter operation are shown in FIG. 3a. When switch 204 is in the On state, current flows through the switch and transformer primary. The current rises in accordance with load conditions and the effect of $L_{leak}$. At switch-off, the voltage rises rapidly (reflected load current in $L_{leak}$) to point "A". Once energy has been transferred out of the leakage inductance, the circuit resonates as the combination of $C_{res}$ 206 and the magnetising inductance of the transformer $L_{mag}$, and other stray reactances. During resonance, the switch voltage reaches a peak then reduces. Depending on circuit values and conditions, it may reach 0V ("B"). Depending on the characteristics of circuit components, the switch voltage may be prevented from resonating below 0V either by diodes associated with the switch, or by the effect of the output diode and voltage on the output capacitor.

Figure 3B:
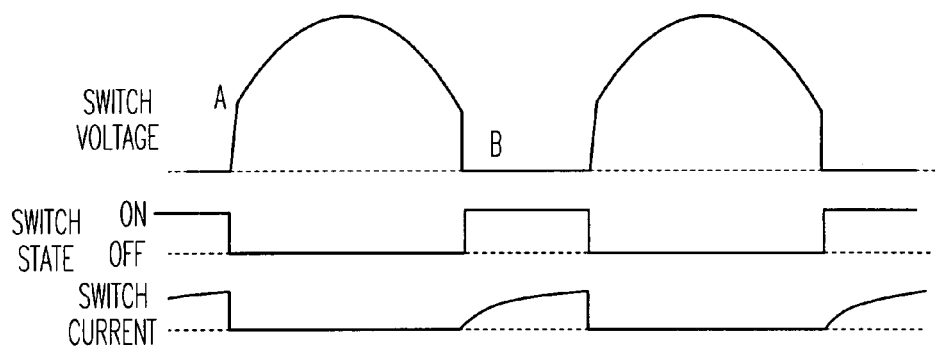
Figure 3C:
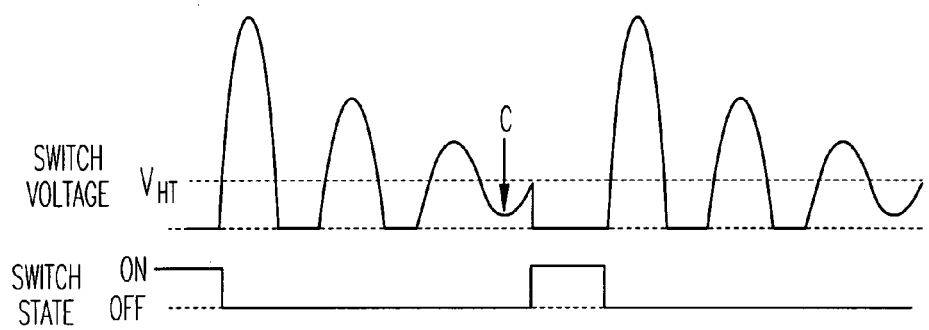

FIG. 3a shows the switch being turned on at point "B". FIG. 3b shows example waveforms of the switch being turned on before the resonant waveform reaches point "B", and FIG. 3c (on a longer time axis) shows the switch being turned on later than point "B". In FIG. 3c, the switch waveform can be seen to oscillate as a damped sinewave around $V_{ht}$. Optimum power transfer is achieved by turning the switch on again at point "B".

It is preferable to adjust one or both of an on-time of the switch and an off-time of the switch to control the power transfer. However, the on-time is preferable chosen to correspond to the resonance of the switch voltage.

Preferably, the switch is turned on when the switch voltage is close to 0V ("B" in FIG. 3a). For situations where there is an extended off-time (as shown, for example in FIG. 3c), it is preferable to turn the switch back on when the resonant voltage is at an instant of minimum voltage (e.g. "C" in FIG. 3c); this reduces EMI and turn-on loses in the switch 204.

Figure 3D:
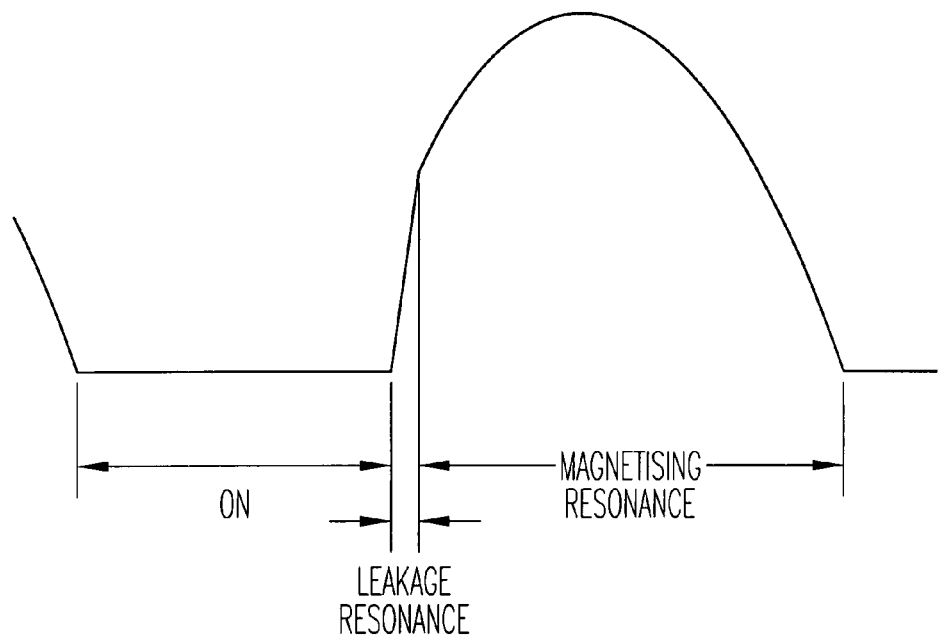

Apart from component values and parameters, the resonant waveforms observed in an RDFC vary according to load and switching conditions. FIG. 3d is a more detailed view of the waveform shown in FIG. 3a and shows the main parts of the observed resonance wave. The polarity represents the voltage across the power switch assuming a positive supply to the transformer primary and the power switch is connected in the other connection of the primary to the negative supply.

The three main parts are:

On-period: when the power switch is turned on, connecting the transformer primary to the power source. Voltage across the switch is low. During this period current flow is principally reflected secondary (load-related) current and magnetising current rising according to the primary inductance and supply voltage etc.

Leakage resonance: In this period, current continues to flow in the secondary. The primary voltage is a (fast) resonance of the leakage inductance with the resonant capacitance. The magnitude of this resonant voltage depends on the current at turn-off and the leakage inductance. The former is typically mostly the reflected secondary current, but there may be a small contribution from magnetising current, depending on circuit parameters. Typically, this resonance is fast and the turn-off time of the switch may be significant so the exact waveform is complex.

Magnetising resonance: Once the secondary current has substantially decayed, the wave results from resonance of the magnetising (primary) inductance and the resonant capacitance. The amplitude depends on the magnetising current at the end of the on-period which depends on the magnetising current at the beginning of the on-period, the supply voltage and the duration of the on-period etc.

As load and switching conditions vary, the principal effects are:

Amplitude and duration of the leakage resonance increases with the sum of reflected load current and magnetising current. These scale according also to the magnitude of the leakage inductance.

Amplitude of the magnetising resonance increases with on-period and supply voltage. Duration of the magnetising resonance depends on the magnetising current remaining at the end of the leakage resonance and the voltage at that time.

Figure 3F:
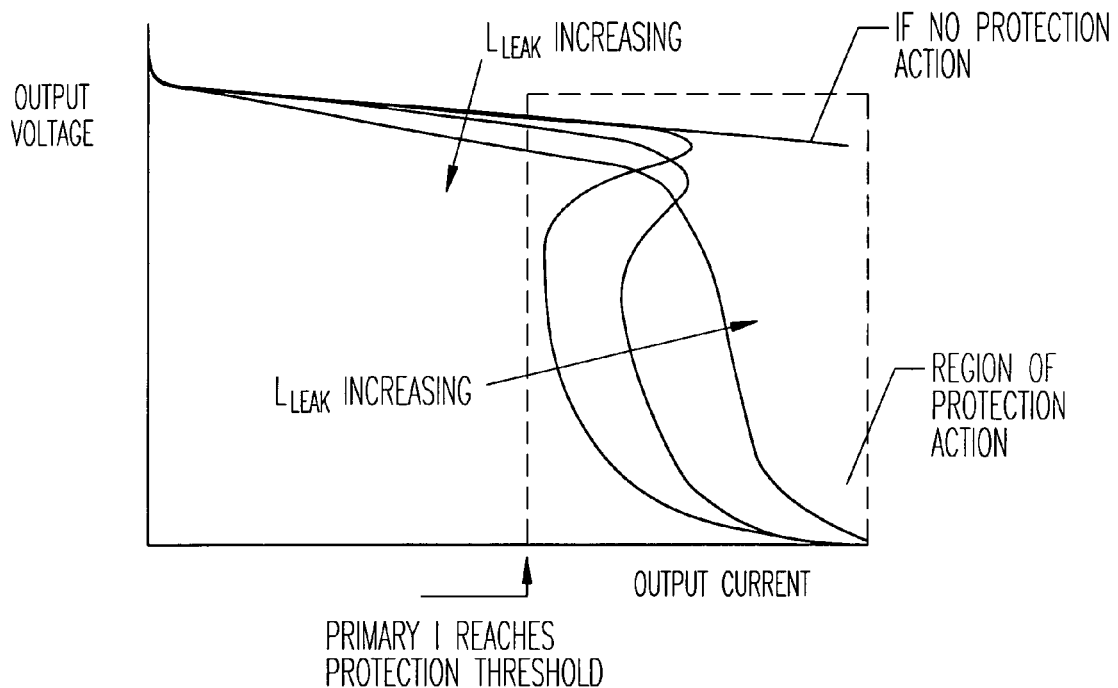
FIG. 3f shows the effects of protection threshold and leakage on the output voltage/current characteristic.
Figure 3E:
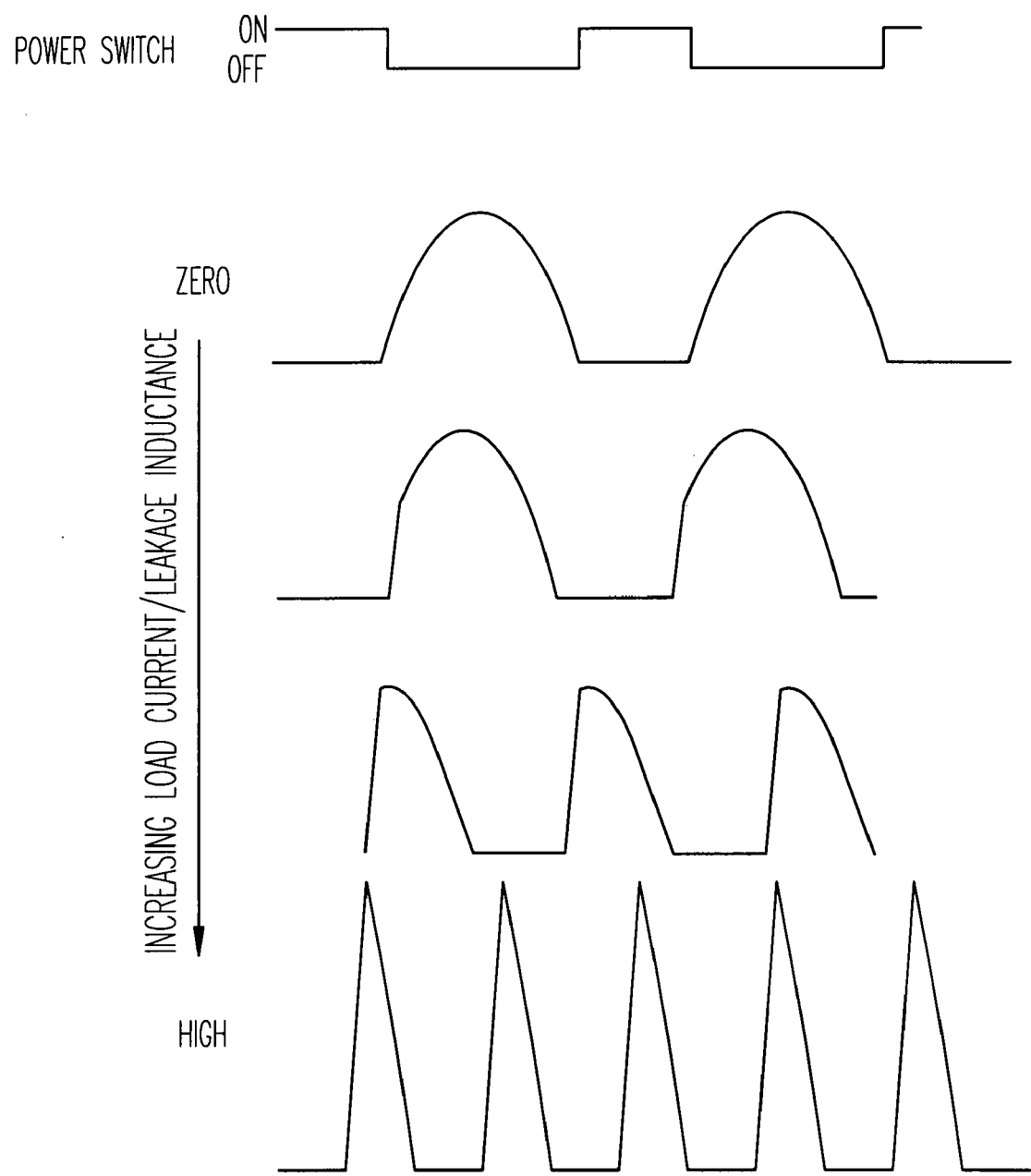

Typical waveforms are illustrated in FIG. 3e; all correspond to the condition where the on-period commences immediately the switch voltage reaches a minimum. Though the on-time and reflected secondary current are not necessarily dependent, in typical applications the on-period is shortened when the secondary current is high in overload.

In applications where the power transfer is varied by changing the on-time and off-time of the primary switch, at least three operational modes to manage power are identifiable:

Maximum power (Maximum on-time and minimum off-time)

Medium power (Reduced on-time and minimum off-time)

Low power (Minimum on-time and extended off-time)

A preferred power management technique has the following operating modes:

"Standby B" (Low power): minimum on-time and extended off-time

"Standby A" (Low/medium power): variable on-time and resonant off-time

"Normal" (Medium/high power): maximum on-time and resonant off-time

"Overload" (High power): on-time shortened according to trigger of over-current protection by the instantaneous primary switch current, resonant (or minimum) off-time "Foldback" (Limited power): on-time shortened as for Overload, off-time extended to reduce power and current "Burst" (short-term maximum power): As overload, but applied for a fixed duration (or number of cycles) to provide robust start-up Preferably, the on-time is reduced before increasing off-time. Reducing the on-time minimises transformer losses, EMI and audible noise, as the core flux is reduced (consequence of reducing on-time). Minimising the off-time allows the on-time to be maximised at medium and high powers, whilst staying within allowable core flux, as this maximises the reverse magnetising current from the previous cycle.

Preferably, change of mode is performed on the basis of the measured primary switch current and its rate of rise, but a further choice is the rate at which the controlled parameters (on-time and off-time) are changed in response to the measured current. If the controlled parameters change slowly then the system will also respond slowly to changing conditions, possibly leading to undesirable voltage excursions.

A common requirement for power supplies and power converters is to include protection against adverse effects of overloads on either the power supply itself or on any connected load. Typically, overload protection limits the output current; the limit may be dependent on the output voltage itself. An example is commonly known as "foldback" where the limited current is lower when the output voltage is lower; it is used to limit power dissipation in fault conditions.

However, it is desired that sufficient power is delivered in transient and transient non-fault conditions, such as during start-up when large capacitors internal to the load must be charged quickly to the required operating voltage.

In addition to "overload" characteristics, there are some loads that require particular voltage/current characteristics, for example rechargeable batteries. Power must be delivered to these over a range of voltages, and with both current and voltage limiting to avoid damage or deterioration.

The forward converter does not have inherently good power/current limiting so it is desirable to manage the on-time and off-time to achieve a good characteristic. It is known to use circuits on the load (secondary) side of the transformer to monitor load current and delivered voltage. Signal(s) are passed back to the controller on the primary side to set the power delivery to achieve the required response. However this normally requires galvanic and safety isolation of the signals, which are expensive.

In embodiments of the present invention, this large cost is overcome by sensing only on the primary side. If an adequate power management characteristic can be achieved by sensing signals only from the primary side of the transformer then a lower cost is possible.

A useful parameter is the current through the primary switch which is approximately proportional to input power. If this current is compared against a threshold then a condition of overload can be recognised and appropriate action taken e.g. Turn off and disable turn-on. This has an advantage in that a quick response to overload and protection of the RDFC is achieved. However, this method is sensitive to on/off ratio.

Alternatively, the peak and/or average value of current can be tested, which gives a true measure of power input, but has to be taken over a sufficient period to even out variation due to e.g. ripple at supply line frequency.

A combination of the above methods is possible. However, for simplicity and robustness, peak-current limiting is preferred.

In such a method, the instantaneous current though the primary switch is compared against a threshold and the switch is turned off if it is exceeded. Preferably, the controller will turn on again (after resonance) to attempt to maintain power output. However, the controller may alternatively disable the switch such that the RDFC goes into a fault state to prevent any further power delivery.

When the on-time is cut short by excessive primary switch current, typically the off-time does not change proportionately as much, since it follows the resonance of the circuit. Consequently the on/off ratio reduces, further reducing power delivered to the load. As the load to the converter is increased, this may manifest as negative effective output resistance.

At low output voltages, the primary switch current rises rapidly during the on period. Any delay in recognising this condition and turn-off of the switch can lead to excessive currents in either the transformer primary or secondary circuits. Further, at low output voltages, reset of the secondary winding inductance voltage may cause secondary current to flow for much longer than the on-period of the switch. This delivers higher currents to the load which may cause adverse effects. It is therefore preferable to include further protection in these circumstances.

To detect this condition it is possible to sense when the on-time reduces below a predetermined threshold, either as a fixed value or a proportion of a measured resonance time, or some combination of the two. As the output voltage is reduced, the on-time reduces because the rate of rise of primary switch current rises, so crossing the over-current threshold sooner. Further protection can be triggered when the on-time reduces below the threshold. Triggering can be on the basis of short on-time in any individual cycle or if this occurs for a predetermined number of cycles. A predetermined number of cycles is preferable because it avoids false triggering caused by system noise or short-term events.

Though it is preferable to turn off the switch when the current passes a threshold, and to use this time to change to a protection mode, it is not essential. Alternatives include:

Separate thresholds to force switch turn-off and to trigger a further protection mode. The latter threshold would be set at a lower current compared to the former.

Switch turn-off occurs after a delay following the time when current exceeds the threshold whereas the duration that triggers further protection is substantially the delay until current reaches the threshold These may be preferable where it is desired to obtain an overload characteristic that:

delivers output power more robustly before further protection triggers or has a characteristic that can be modified automatically or where further levels of protection are triggered by low output voltage, not only by peak primary current For example, when the transformer has a relatively low leakage inductance or high equivalent series resistance, the rise time of the current is a small portion of the on-period. It is this rise time that indicates the input-output voltage mismatch but it is the current delivered in the remainder of the on-period and the duration of the on-period that determines the power delivery. So, further protection can be triggered by low output voltage, but high power can be delivered before protection operates.

As load current increases, the on-period primary current also increases. The overload current threshold is used to shorten the on-period to protect the system and any connected load. The effect is to shorten the on-period when high currents are taken, causing the output voltage to fall (or remain low). At the same time the increasing current at turn-off will cause a larger rise due to leakage inductance. The combination causes a reduction in resonance time, so the operating frequency typically increases. Depending on the value of the leakage inductance in relation to resonance, the system may exhibit a range of behaviours with increasing load.

| Leakage | Behaviour |
| --- | --- |
| Low | Primary current very sensitive to Vin-Vout', short time constant of Lleak/Rtot. On-period reduces rapidly with reducing output voltageResonance period shortens less quickly than on-periodOutput current falls Negative output impedance |
| High | Primary current less sensitive to Vin-Vout', long time constant of Lleak/Rtot. On-period reduces slowly with reducing output voltageResonance period shortens more quickly, due to effect of leakage energyOutput current maintainedPositive output impedance |

The effects of protection threshold and leakage on the output voltage/current characteristic are illustrated in FIG. 3f.

The voltage/current characteristic of a converter may be altered to suit the application by choosing or adjusting the following factors:

Leakage inductance as a proportion of the magnetising inductance

On-time, optionally by changing the resonance period via the magnetising inductance and resonating capacitance Overload current threshold Response of the controller to the overload signal (e.g. reduction of on-time)

Once triggered into an overload condition, there is a range of possible protection strategies, such as complete cessation of operation or run in a low-duty ("foldback") mode. Once in the overload condition, the length of time before exiting the overload condition may include:

a) Until user intervention e.g. by reset control or by removal and re-application of input voltage b) Until on-time increases above the threshold, or above some other time threshold c) For a predetermined time then attempt to restart according to a robust scheme and return to foldback mode if on-time is still short or return to normal operation if the on-time has increased sufficiently.

Option a) can have a high degree of safety but may be inconvenient. Option b) requires continued converter operation, which has to be at a low duty. At low duty, the output voltage (hence the on-time) is unlikely to recover with typical loads, so it would be desirable for user intervention to reduce or remove the load before restart is possible.

Option c) is preferred as it avoids the need for user intervention but can still provide good safety because power and current, averaged over a foldback/restart cycle, can be limited to acceptable values.

An example of a robust restart scheme is to operate the converter in "normal" mode for a short predetermined period ("burst"), limiting the on-time by over-current protection as described above, but not responding to short on-time. The length of the burst must be sufficient to restart all normal loads but not so long as to pose a hazard due to high currents and associated heating during the burst.

When the output voltage is low the on-time is typically short (limited by overload protection) but on-state current may be high. If the off-period is set to the resonance period a consequence may be that the on-period is comparable to the off-period, rather than substantially shorter. With high current delivered to the output during the on-period, the average output current may also be high. In some circumstances this may be desirable, for example to start-up quickly with highly capacitive loads, but may be excessive in others, causing damage or undesired behaviour. To avoid this, a convenient modification to the method is to limit the minimum off-period to a preset time, or a time measured from resonance under other load conditions. The effect is to reduce the on/off ratio in conditions of high overload. Alternatively or additionally, the on-period may be shortened further (less than that determined by the overload current threshold), in response to short resonance period.

Additionally, the change of on-time during the burst may be monitored. If the on-time increases (i.e. the time taken to trip the over-current protection on each converter cycle) then this normally indicates that the output voltage is increasing; in this case the burst can be continued since it appears that the system is recovering. If it does not increase, or if the rate of increase is below a predetermined rate, then it is determined that the system is not recovering and the burst may be terminated sooner. This assures protection in overload conditions but improves the ability to restart with heavy and/or highly capacitive loads.

To minimise size and cost of power converters, it is preferable to use the maximum available range of flux in the transformer core, limited by the characteristics of the core material. In resonant operation, there may be a "negative" flux in the core at the beginning of the on-period of the power switch. During the on-period, the core flux increases (tends to more positive) and reaches a maximum approximately at the end of the on-period.

On-period is a primary means of control of power delivery, enabling reduction of power in response to light load or overload. In a particular design of power converter it is necessary to manage the on-period to ensure that a large, but not excessive, flux range is used. In resonant converters, the negative flux at the beginning of the on-period may be significant in reducing the peak positive flux at the end of the period. This can cause difficulties when the on-period or off period are changed, because both affect the negative flux at the beginning of the on-period.

If the on-period is increased in one converter cycle compared to the previous, the negative flux at the beginning of the on-period may be insufficient to limit the flux at the end to an acceptable level. To avoid this problem, it is preferable to limit the rate of increase of on-period between successive cycles. The increase between cycles may be simply at a fixed predetermined rate or, preferably, at a rate determined from the maximum on-period (itself may be determined from the estimated resonance time), such as a fraction of the maximum on-period.

Changes to the off-period affect the negative core flux at the beginning of the next cycle in complex ways. Firstly, the flux oscillates due to the resonant behaviour and secondly, it tends to decay as a result of circuit losses. As described elsewhere, to manage power delivery it is preferable to reduce the on-period before increasing the off-period. In these circumstances, there is no risk of excessive core flux provided the on-period is reduced to a relatively low value before the off-period is increased.

Electronic systems commonly need supply voltage to be controlled within a narrow range. Converters and power supplies often have voltage stabilising systems to reduce the variation of output voltage when input voltage, output voltage or other conditions (e.g. temperature) change. The present invention also attempts to reduce the effect of load current on output voltage.

Figure 4A:
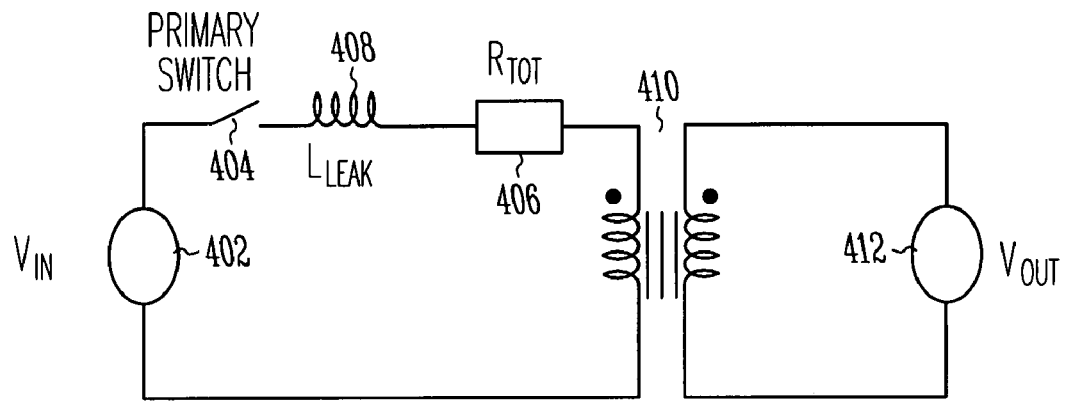
FIGS. 4a and 4b show simplified equivalent circuits of an RFDC.

FIG. 4a shows a simplified equivalent circuit of and RFDC during the on-time of the primary switch. The circuit comprises an input supply 402, a switch 404, a primary-referred circuit total resistance (including contributions from the switch, transformer, output diode, output capacitor etc.) 406, a leakage inductance of the transformer (referred to primary) 408, a transformer 410 and an output voltage (including any fixed voltage drop e.g. in output diode) 412.

Figure 4B:
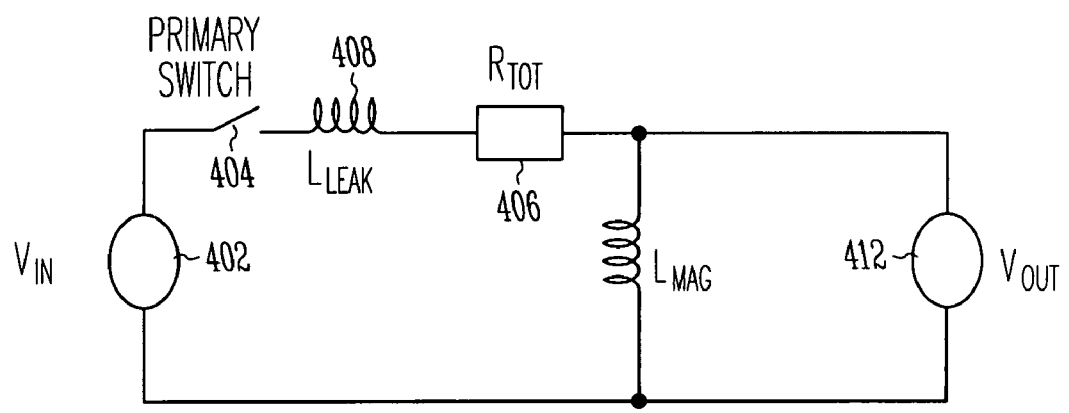

FIG. 4b shows a further simplified circuit of the circuit shown in FIG. 4a. In FIG. 4b, the secondary side parameters are referred to the primary side. When the switch is closed, the current builds through the loop according to the voltage difference between the supply ($V_{in}$) and the output voltage referred to the primary side ($V_{out'}$). Since $L_{mag}$ is typically very large in comparison to $L_{leak}$, its effect can be neglected when the on-time is short and there is significant difference between $V_{in}$ and $V_{out'}$.

Figure 5A:
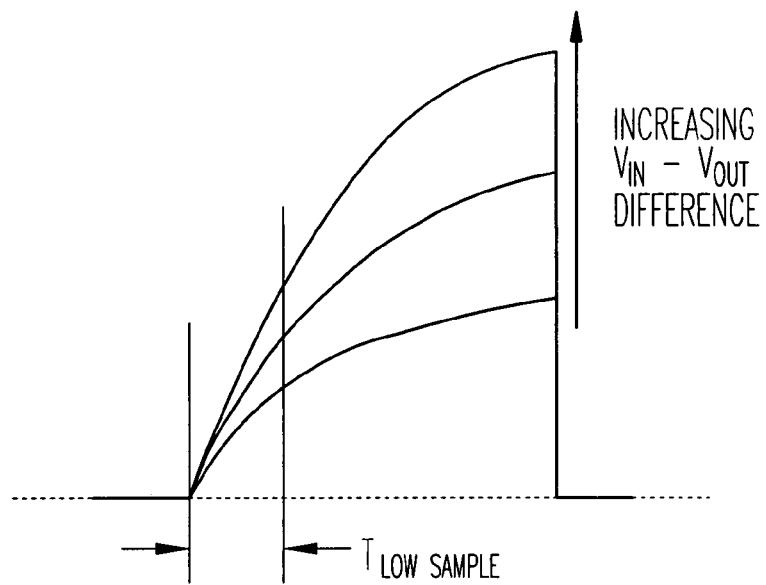
FIG. 5a shows a range of current waveforms corresponding to different Vin–Vout' differences.

FIG. 5a shows a range of current waveforms corresponding to different $V_{in}$–$V_{out'}$ differences.

Figure 6:
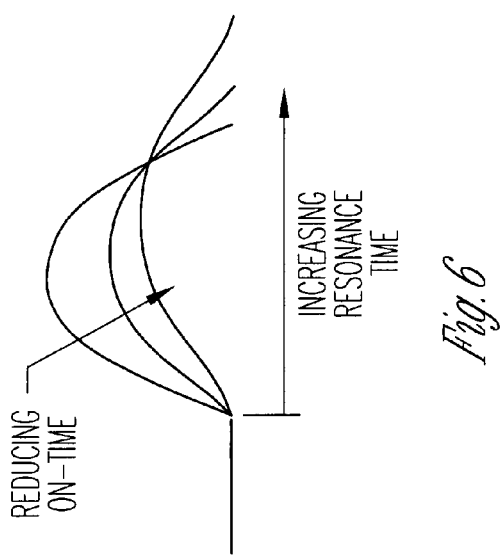
FIG. 6 shows an increasing resonance time with a reduced on-type of the switch of the RDFC.

In RDFC operation it is possible to reduce the on-time while maintaining resonant conditions during off-time. Typically, the off-time increases as the on-time reduces, due to the reduced amplitude of oscillation during resonance (shown in FIG. 6). Whether the off-time increases or not, the converter duty can be reduced simply by reducing the on-time. When the duty is reduced, the average current delivered decreases for a given input-output voltage difference; or alternatively for constant load, the output voltage will fall if the duty is decreased.

To control the duty in relation to the delivered power requirement it is desirable for the controller to have access representing the latter. This can be done using an electronic circuit to measure delivered current and/or voltage, comparing it against a reference then using the resulting error signal to adjust the converter duty. However in the case where the output has to be galvanically isolated from the input (e.g. mains-powered off-line converters), signals should be passed across an isolation barrier, typically by optically-coupled isolators. The cost of these are significant in low-cost applications. In these cases it is preferred to adjust the converter duty in response to parameters available on the primary side of the transformer, primary switch current for example. Control of the output voltage can be achieved by adjusting the converter duty (by changing the on-time) in response to current measured during the on-time.

Referring to FIG. 5a, the current is measured at a fixed delay after switch-on (Tlowsample). If the current at this time is above a predetermined threshold then the on-time (hence duty) is increased, if it is below the threshold then the duty is decreased. For example, suppose the output voltage of the converter is low, this gives a fast rate of rise of current during the on-time so the sampling will record a current above the threshold. This causes an increase in duty, with consequent increase in output current. The effect is to tend to stabilise the control in a condition where the Vin–Vout' difference is substantially constant.

For proper control by this method it is desirable that the time Tlowsample is consistent, measured from the time when the switch current starts. This is not the same as the time when the turn-on signal is applied to the switch (typically implemented as a transistor); there may be a delay between this signal and the time when the switch voltage has fallen to a low value and current starts to build. If there is error in timing, this manifests as a variation of Vin–Vout over the working range of loads. The error can be minimised by:

Ensuring fast turn-on of the switch e.g. by applying a high turn-on current/voltage Measure the switch voltage and time the Tlowsample from when the voltage reaches a predetermined low value Measure the switch current and time Tlowsample from when it increases above a predetermined low value.

For simplicity, the first of these is preferred.

Figure 5B:
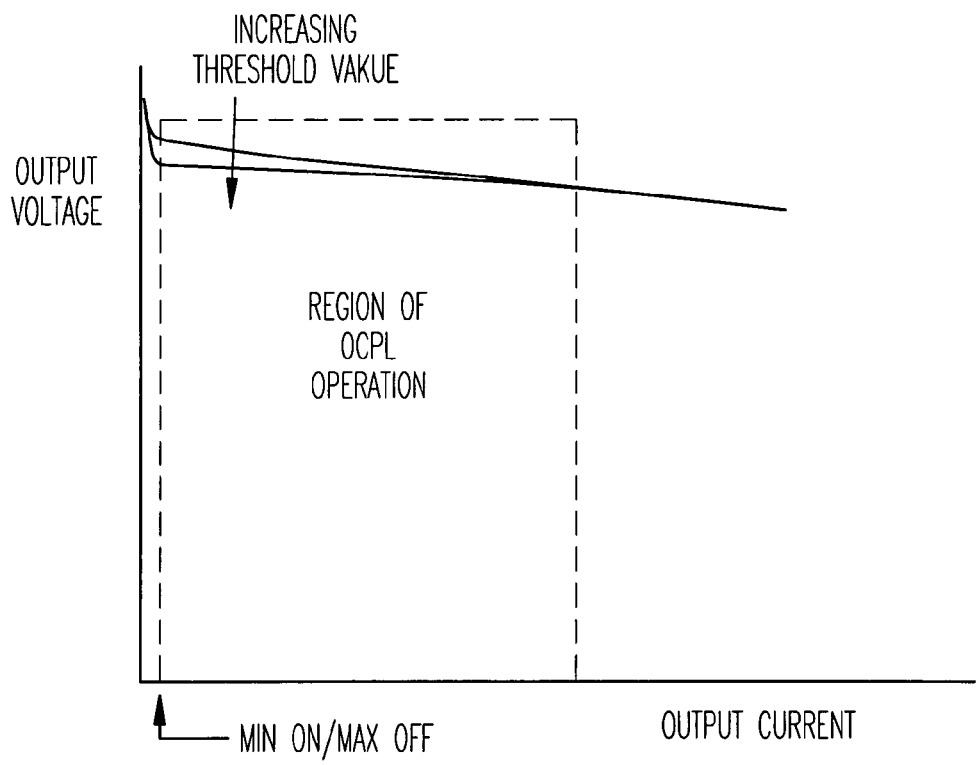
FIG. 5b shows the effect of regulating power delivery in response to time-sampled primary current.

The typical effect of this technique is illustrated in FIG. 5b. The threshold value may be chosen to alter the slope of the V-I characteristic in the control region, a higher threshold reducing the slope. If excessive, the slope may reverse which manifests as negative output resistance which may be undesirable as it typically causes instability of output voltage.

A further useful characteristic of this technique is that the converter duty cycle automatically reduces (reduced on-time and, possibly, extended off-time) as the load reduces. This reduction in duty cycle also reduces the power dissipated in the converter (from resistive, core and switching losses), which is very desirable in order to maximise conversion efficiency and to reduce wasted power in low- or no-load conditions. Very low duty cycles may be achieved by increasing the off-time (once the on-time has already been reduced to a minimum), with consequent reduced power waste and consistent regulation. However other factors may limit. The minimum duty cycle, the need to maintain power to the controller via an auxiliary winding is an example. As the load is reduced, but the duty cycle reaches a minimum, the output voltage will then rise, as shown in FIG. 5b.

Such control is effective only over the available range of duty control. If the duty reaches the maximum or minimum limits imposed for other reasons then voltage control is lost and the output voltage will increase or decrease accordingly. Maximum duty is set by the maximum on to off ratio, discussed above. For reducing load, the duty can be reduced indefinitely, preferably by reducing the on-time first then subsequently increasing the off-time, also as discuss above. However, if off-time is increased to a long time, the response to load increase may be unacceptably slow since no indication is available until the next converter cycle. Another limitation on allowable off-time may be a need to maintain power to the converter via the RFDC itself (see below).

A further benefit of varying the duty cycle with load is the possibility of reducing power waste at low (or zero) loads. Though the RDFC topology generally gives good efficiency, energy is wasted in several ways including, for example: Drive power to ensure the switch turns on; hysteresis and eddy current loss in the transformer core; loss associated with turn-off of the switch and output diode, energy stored in the resonating capacitor if the switch is turned on with non-zero voltage e.g. when off-time is extended beyond resonance.

There are other loss mechanisms, but the above cause loss on a per-cycle basis. So, to minimise the power loss from these it is preferable to reduce the frequency of cycles. Reducing the on-time, without increasing the off-time, also offers some energy saving mainly by reducing the hysteresis loss of the core. However this saving may be outweighed by the increased loss due to adverse duty cycle causing higher on-state currents. Overall, it is particularly beneficial at low loads to reduce the on-time and increase the off-time. This is achieved by the voltage control scheme described above. However it could also be achieved without the voltage control by measuring primary switch current in some other way and adjusting the duty accordingly. A preferable method is to measure the average of the current or integral over one, a few or many converter cycles. For AC/DC converters it is preferred to measure over a half or full cycle of incoming line waveform as this avoids noise and errors due to line-frequency variations.

We now describe low power operation without voltage regulation.

In applications where improved voltage regulation is not needed, this is an alternative method for managing converter duty in relation to applied load. One scheme is to compare the on-state switch current, sampled at the end of the on-period; to a fixed threshold. If it is above the threshold then the duty is increased (reduce any extended off-time then increase the on-time), it is below then the duty is decreased. However, at low loads the effect of magnetising current can be significant and may be mistaken for apparent load causing incorrect low-load behaviour. One method to avoid this is to integrate the supply current over the converter cycle, the integral then being insensitive to magnetising current. However this can be a difficult or expensive process to embody. An alternative, using the example of reducing load, is:

Monitor primary switch current and reduce on-time (but off-time set for resonance) as described above.

Once a preset minimum on-time has been reached, force an extended off-time followed by a minimum on-time. The primary switch current at the end of this on-time is measured and held as a subsequent reference.

Continue with cycles of extended off-time and minimum on-time, each time comparing the primary switch current to the held reference.

If the switch current, less the reference, is above a preset threshold then return to converter cycles using resonant off-time, rather than extended off-time. Otherwise continue with extended off-time The control techniques described here may be embodied in system at low cost with few components. Preferably, an integrated controller device works with a low-cost power bipolar transistor to make an off-line power converter with several commercial advantages, including: high power capability despite small and low-cost components, the use of bipolar power switch transistor rather than the higher-cost alternative of power mosfet or IGBT; compact size; low power loss in low/no-load conditions; and high conversion efficiency.

Figure 7:
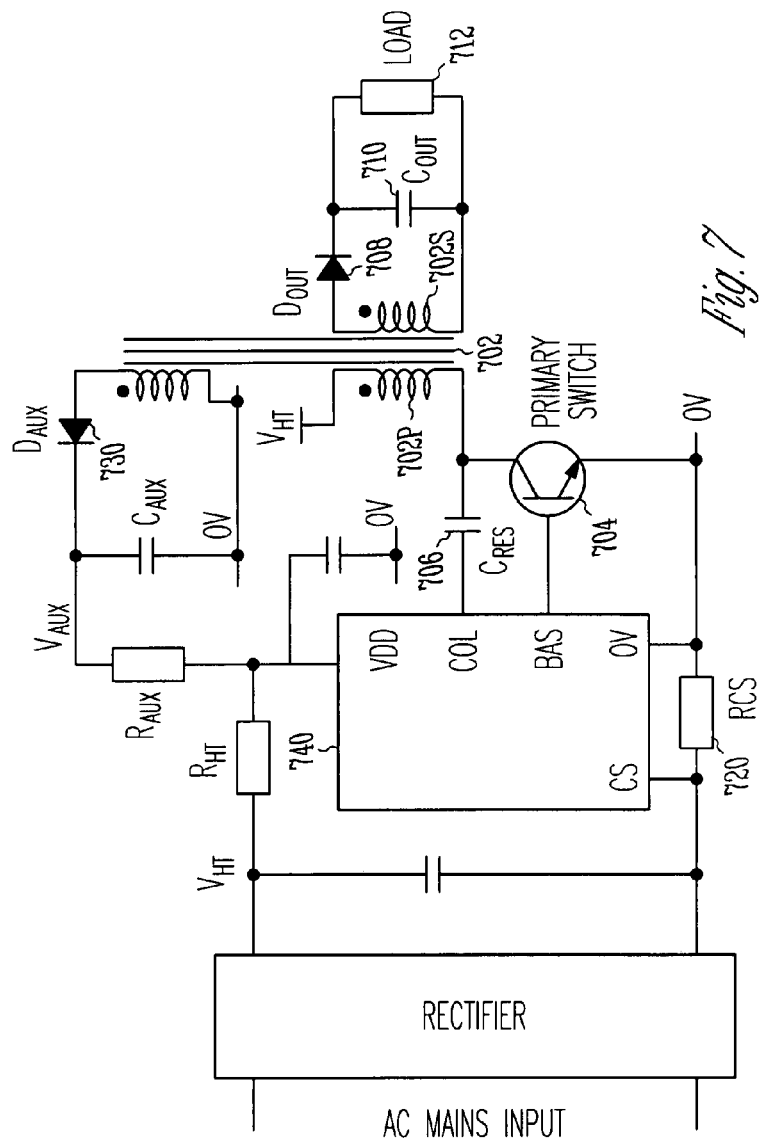
FIG. 7 shows an example RDFC according to the present invention.

FIG. 7 shows an example RDFC 700 with such a controller. The RDFC comprises an isolating transformer 702 having primary $702_P$ and secondary $702_S$ windings. A switch 704, when closed, applies a DC voltage $V_{ht}$ across the primary winding of the transformer. Power is delivered to the load 712 via a rectifying diode 708 and smoothing capacitor 710. The polarity of the transformer is such that power is supplied to the output circuit when the primary switch is closed.

The RDFC further comprises an RDFC controller 740. The controller preferably includes both analog and digital circuits to implement the above-mentioned control functions in accordance with the present invention. Preferably, the controller is fabricated in a low-cost conventional CMOS process.

The controller 740 is AC coupled to the primary winding of the transformer to sense a primary signal via a resonance capacitor 706, which also acts as the resonance capacitor for the RDFC. It is particularly advantageous for the capacitor to serve both functions; high voltages typically occur during converter operation and capacitors capable of withstanding them are expensive. Alternatively, two or more capacitors could be employed, one to couple signal to the controller and the other to supplement the resonance. This may be necessary in high power converters where the resonant current is high and unsuitable for applying in its entirety to the controller input. Optionally, the resonance may be coupled to the controller from a winding of the transformer other than the primary winding, the auxiliary winding for example. Furthermore, the primary switch current is sensed by a single resistor $R_{es}$ 720

The controller is configured to provide a drive signal to the primary switch in response to the above-sensed signals.

Auxiliary power for the controller device and for base current to the primary switch is derived from an additional winding on the converter transformer, shown in this instance operating in a forward mode. This mode is preferred as it minimises the range of auxiliary voltage $V_{aux}$ under conditions of varying duty cycle and load.

Where the controller is powered from an auxiliary supply derived from the converter itself, there is an opportunity to use the rectified auxiliary voltage to manage the off-time in low power or foldback. In these modes, minimum converter duty (on-time and off-time) may depend on both maintaining sufficient output power delivery and maintaining sufficient power to operate the controller. The latter can be sensed via the auxiliary supply voltage or current and, if it falls, the duty increased to maintain adequate power to ensure proper operation High loads (reduced or zero output voltage) tend to reduce $V_{aux}$ via the transformer action. Therefore, it is preferred to include a shunt-mode voltage regulator in the controller device and supply via a resistor ($R_{aux}$) from $V_{aux}$ to avoid malfunction of the controller. In this way, an accurate controller supply voltage can be provided despite changes in input voltage and load conditions.

However, a wide range of $V_{aux}$ can still lead to high power dissipation, which is undesired, especially in no/low-load conditions. Preferably, the effect of load on $V_{aux}$ is minimised by the construction of the transformer. For example, the winding sequence can be constructed (from core outwards): Auxiliary, Primary and then Secondary. Furthermore, the secondary winding leakage inductance can be increased by winding over a reduced length of core, in comparison to the width of the primary and auxiliary windings.

To enable the controller to start up correctly from an unpowered state, power is preferably taken from the rectified high voltage supply via high value resistor $R_{ht}$.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A method of detecting an overload condition of a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, said method comprising:

sensing a primary winding signal during an on period of said switch, said primary winding signal representing an operational current in said primary winding;

comparing said sensed primary winding signal with an overload threshold; and generating an overload signal for triggering an overload condition in said RDFC, said overload signal representing a period during which said sensed primary winding signal is greater than said overload threshold;

the method further comprising:

sensing a first event associated with switch on of said switch;

sensing a second event associated with said overload signal;

determining a duration between said first and second events;

comparing said duration with an overload period threshold value;

generating an early overload detection signal for detecting an early overload condition of said RDFC, said early overload detection signal being generated in response to said sensed duration being below said overload period threshold value.

2. A method according to claim 1, wherein said duration is sampled over two or more on and off cycles of said switch and wherein said duration is compared with said overload period threshold value.

3. A method for regulating an output voltage of a resonant discontinuous forward converter (RDFC), said converter including a transformer with primary and secondary matched polarity windings and a switch to, in operation, cyclically switch DC power to said primary winding of said transformer, said converter further having a DC output coupled to said secondary winding of said converter, said method comprising:

sensing a primary winding signal during an on period of said switch, said primary winding signal representing an operational current in said primary winding;

comparing said sensed primary winding signal with a regulation threshold value; and controlling one or both of an on and off duration of said switch in response to said comparison;

wherein said sensing of said primary winding signal comprises:

detecting turn on of said switch;

waiting for a delay period;

sampling said primary signal at an end of said delay period.

4. A method according to claim 3, wherein said detecting turn on of said switch comprises:

detecting an increase in said primary winding signal following turn on of said switch that is greater than a first threshold.

5. A method according to claim 3 wherein said detecting turn on of said switch comprises:

detecting a drive signal of said switch.

6. A method according to claim 3, wherein said detecting turn on of said switch comprises:

detecting a voltage across said switch.

* * * * *